United States Patent [19]

Micka et al.

[11] 4,052,699
[45] Oct. 4, 1977

[54] HIGH SPEED REAL TIME IMAGE TRANSFORMATION

[75] Inventors: William Frank Micka, Binghamton, N.Y.; Thomas Scott Robinson, Rochester, Minn.

[73] Assignee: International Business Machines Corporation, Armonk, N.Y.

[21] Appl. No.: 701,433

[22] Filed: June 30, 1976

[51] Int. Cl.$^2$ ............................................. G06K 9/00
[52] U.S. Cl. .................. 340/146.3 MA; 235/92 DP; 364/900
[58] Field of Search ............. 340/146.3 MA, 146.3 H, 340/146.3 Y, 146.3 AE, 146.3 AC, 172.5, 173 R, 173 DR, 173 FF, 173 RC; 235/92 CV, 92 EA, 92 SH, 92 ST, 92 DP; 179/15 A, 15 AA; 364/900

[56] References Cited

U.S. PATENT DOCUMENTS

| | | | |
|---|---|---|---|
| 3,634,823 | 1/1972 | Dietrich et al. | 340/146.3 Y |
| 3,761,876 | 9/1973 | Flaherty et al. | 340/146.3 MA |
| 3,811,110 | 5/1974 | Inose et al. | 340/146.3 MA |
| 3,938,102 | 2/1976 | Morrin et al. | 340/146.3 MA |
| 3,941,982 | 3/1976 | Knollenberg et al. | 340/146.3 MA |
| 3,969,704 | 7/1976 | Liebel, Jr. | 364/900 |
| 3,984,811 | 10/1976 | Nyssens et al. | 364/900 |

*Primary Examiner*—Leo H. Boudreau
*Attorney, Agent, or Firm*—Andrea P. Bryant

[57] ABSTRACT

In an image processing system, words of bit length $n$ of video data representing a horizontally scanned image are sequentially loaded in parallel by row into a matrix memory having $n$ rows and in columns. The matrix memory is unloaded sequentially in parallel by column into an array of shift registers of $n \times n$ bit capacity. Each shift cycle yields a word comprising all bits from the corresponding bit position in each register.

6 Claims, 6 Drawing Figures

HIGH SPEED REAL TIME IMAGE TRANSFORMATION

BACKGROUND OF THE INVENTION

1. Field of the Invention

This invention relates to image processing systems. More particularly it relates to video data preprocessing.

2. Description of the Prior Art

Existing image processing techniques such as optical character recognition (OCR) operate on vertically oriented segments of a scanned image. Flying spot scanners easily yield vertically oriented image data. Newer scanning techniques while less expensive and more reliable because of fewer maintenance problems, include horizontal arrays of scanning devices relatively moveable to the document to be scanned. Scan output image data is stored for later access. The direction in which the relative movement occurs is often perpendicular to image or character orientation, thereby necessitating 90° rotation of stored video access orientation before initiating further steps in the operating cycle.

The prior art suggests accumulation of video data from a plurality of scan lines representing a complete image or an entire character line before performing rotation or other preprocessing functions.

One such method is proposed in the IBM Technical Disclosure Bulletin, Vol. 17, No. 10, March 1975 at page 3026. Disclosed therein is a method and apparatus for, inter alia, transposing a scanned image by serially loading video bits sequentially in a plurality of shift registers each having capacity for a complete scan line. When all registers are loaded the contents of a given cell in each register is sequentially outputted. Access to any cell position is possible only upon completion of the number of shift cycles necessary to bring that cell to the output port of the register. No provision is made for selectively accessing cell locations out of normal sequence.

The disadvantages of shift registers memories when compared to random access memories, lies in the number of cycles required to access a given memory location. Moreover, present day random access memory devices provide fast access times and are cost competitive with shift register memories.

Another prior art rotation scheme taught in a time sharing environment involves serial storage of horizontal video from a complete line of characters in a memory having as many storage words as scan spots. Each word, in turn, has at least as many storage levels as the number of horizontal scans needed to completely cover a line of printed characters. Parallel readout from the memory is carried out in a manner which directs to the recognition logic a bit stream like that which would have been produced by an optical scanner making a series of vertical sweeps through each character in sequence.

The prior art rotation scheme is not readily applicable in a real time environment where access times and delays must be minimized. The described method is dependent on the speed of incoming data and the delay involved in serially storing an entire line of characters could be appreciable.

A further disadvantage of prior art methods is the requirement for costly, large capacity memories for storing the electronic image of the scanned document during various phases of rotation.

OBJECTS OF THE INVENTION

It is accordingly an object of our invention to rotate scanned image data 90° for subsequent use in image processing at high speed in a real time environment.

It is a further object of our invention to perform 90° rotation with decreased storage requirements and delay time.

SUMMARY OF THE INVENTION

Our invention rotates a scanned image 90° in a piecemeal fashion by providing apparatus and controls for vertically accessing, by word, video data previously stored as horizontal words. We perform an $n \times n$ bit rotation by temporarily storing fixed length words comprising deserialized video by row in a random access memory, selectively unloading $n$ words from a single column in that memory into a translate shift register array of $n$ word length registers and then initiating a shift cycle yielding $n$ vertical words each composed of $n$ bits from a given bit position in each register. Output words are then stored in an external image memory for ready accessibility by subsequent image processing logic.

Our apparatus reduces storage capacity needed to perform rotation and, thereby, the overall cost of image processing equipment and decreases total processing time. Rotation of word square image subgroups permits initiation of certain processing steps earlier in the total operating cycle.

The foregoing and other objects, features and advantages of the invention will be apparent from the following more particular description of a preferred embodiment of the invention, as illustrated in the accompanying drawings.

DETAILED DESCRIPTION

Figure 1:
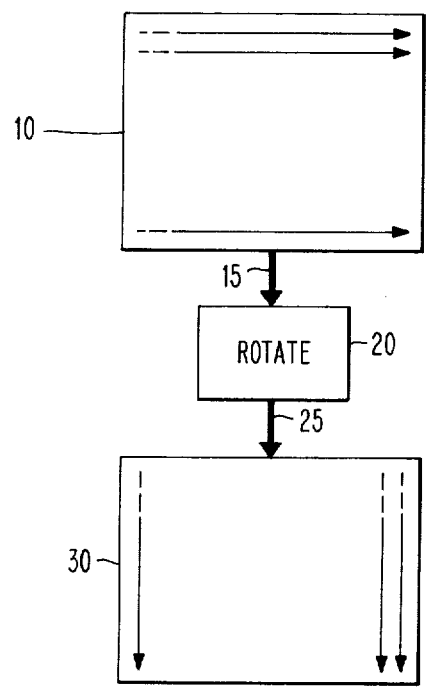
FIG. 1 conceptually illustrates the function performed by our invention.

The horizontally scanned image matrix 10 in FIG. 1 represents the serial output of a scanner producing, for example, up to 2,048 bits per scan. The serial bit stream 15 is input to functional block ROTATE 20 representing the apparatus of our invention for performing in real time at high speed the transformation of horizontally oriented bits into vertically oriented words 25. Vertical words 25 stored in an external memory are illustrated as a vertical image matrix 30.

It is to be noted that FIG. 1 is a purely conceptual representation, as video data is in fact a contiguous serial bit stream, and the vertical matrix 30 is a word high matrix which may extend in our example for 2,048 elements.

It should be further emphasized that our invention accomplishes effective 90° image rotation, by enabling access to the video data in a direction 90° rotated from storage orientation. Thus, in matrices 10 and 30, as shown, there is a one-to-one correspondence between respective bit positions. In other words, our apparatus develops from a horizontally scanned document image data accessible as if the document had been vertically scanned. Image data output from our apparatus is subject to further image manipulation processing. LSI technology could be employed.

The following is a general description of our invention without referring to the drawings. Our apparatus contemplates an $n \times n$ bit rotation scheme. Rotation is accomplished using a pair of buffers in ping-pong fashion and alternately loading one of the pair of buffers by row with video input words from a deserializer while simultaneously unloading the other buffer by column by word. Output words are loaded into an $n$ register translate shift register block. Shifting is initiated when the entire register block is loaded. The $n$ vertical output words from each shift cycle comprise all of the corresponding bits from each word in the column, that is, the first word shifted out comprises bits 0 from each of the words input to the registers and so on.

As used herein, the term byte denotes an eight bit word. Although we have chosen to describe an illustrative embodiment for processing bytes, it should be evident that our invention is applicable to systems based on other storage word lengths. Likewise, while we describe our apparatus to include shift registers, we recognize that equivalent structures including bidirectionally addressable storage arrays made possible by LSI technology could be employed.

Figure 2:
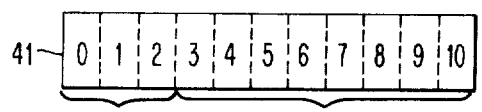
FIG. 2 illustrates the layout of temporary storage areas.
Figure 2:
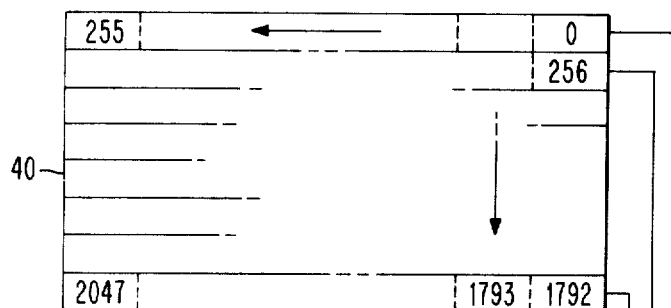
Figure 2:
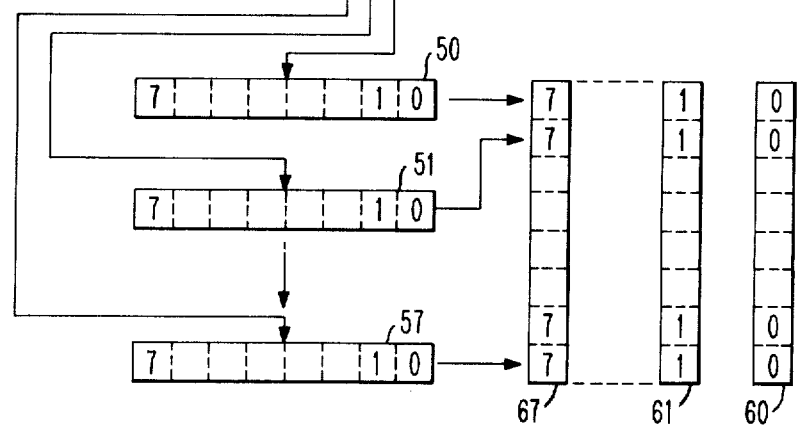

The address rotation scheme of our invention can be better appreciated with reference to FIG. 2. Memory layout 40, shows 2,048 byte locations. As mentioned above, the exemplary embodiment of our apparatus uses two such memories.

As shown in FIG. 2, memory 40 is arranged in eight rows of 256 columns. Each byte position in memory 40 is accessible by means of an eleven bit address vector 41, sequentially incremented from 0 through 2047.

To load memory 40 by byte within row, address vector 41 is incremented at the low order end so that for each decimal value 0 through 8 in row bits 0 through 2, the value of column bits 3 through 10 will cycle from 0 through 255.

For unloading memory 40 by column, the address vector 41 is arranged so that its high order, row, bits 0 through 2 are incremented to cycle through values 0 through 7 for each value 0 through 255 in column bits 3 through 10.

Eight top load registers 50 through 57 shown in FIG. 2 receive bytes transferred from a column of memory 40. In unloading the rightmost column of the memory, for example, the byte stored in position 0 is transferred to register 50; byte 256 to register 51, on up through byte 1792 to register 57.

When all eight registers are loaded their sixty-four bits are shifted out. The first vertical byte 60 shifted out contains bits 0 from each of the horizontal bytes previously stored in the rightmost column of memory 40; the eighth vertical byte 67 shifted out contains all bits 7.

It will be appreciated that as between the eight horizontal bytes input to the eight registers 50 through 57 and the eight vertical bytes 60 through 67 shifted out, relative positions of the bits representing a scanned image are unchanged but the access direction by byte has been rotated 90°.

Figure 3:
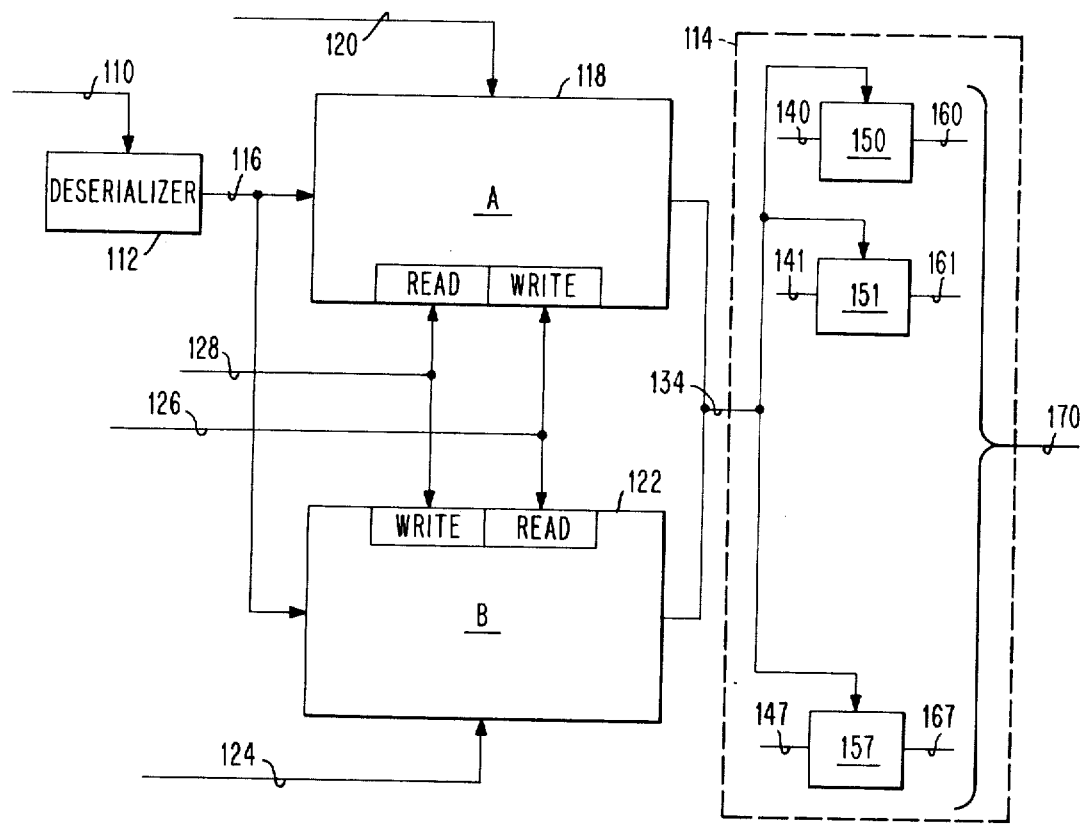
FIG. 3 is a logic diagram of the functional block ROTATE of FIG. 1.

Apparatus embodying our invention is shown in FIG. 3. In terms of data flow, the major components are deserializer 112 for providing bytes of data for temporary storage in either one of buffer pair 118, 122 prior to transfer to the translate shift register block 114.

Serial video data from the horizontally scanned image on line 110 enters deserializer 112, which may be an eight bit shift register. Byte output from deserializer 112 on line 116 is alternately loaded into one of the buffers A, 118 or B, 122. Each buffer is a random access memory having the characteristics of memory 40 described with reference to FIG. 2. The address of the proper byte position in buffer A for receiving a byte from line 116 is on line 120.

The B buffer byte position address is on line 124. Line 126 carries a signal indicating a write buffer A, read buffer B condition. Similarly, line 128 carries the write B, read A signal. A byte read out from either buffer A or B on line 134 is loaded in parallel in the appropriate one of shift registers 150 through 157 as indicated by shift register indicator lines 140 through 147. Serial shift out occurs on lines 160 through 167. The output byte from each shift cycle is on line 170.

Figure 4:
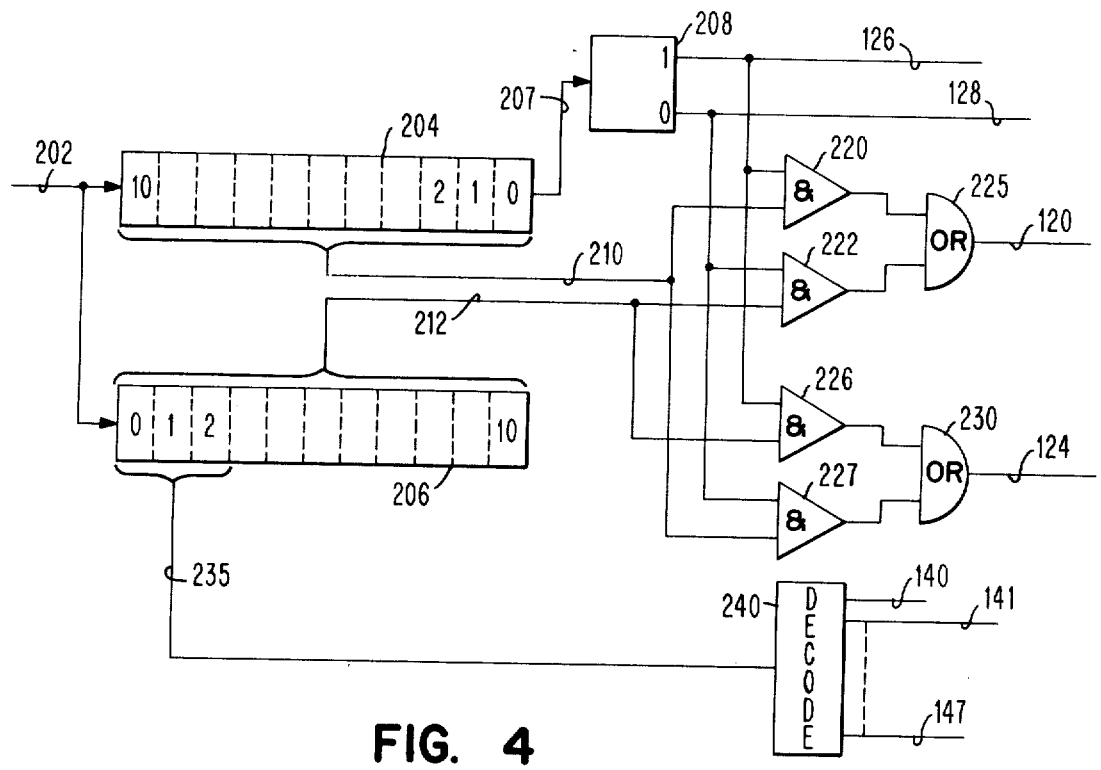
FIG. 4 shows control logic for the apparatus of FIG. 2.

FIG. 4 shows the controls for the apparatus of the invention shown in FIG. 3. Pulses on line 202 from a clock (not shown) increment buffer address counters 204 and 206, each of which is eleven bits long. Address counter 204 is the load buffer address counter. Address counter 206 is used when unloading either buffers A or B.

When buffer address counter 204 reaches its capacity, a carry on line 207 actuates toggle 208 for indicating which buffer is in a write or receiving mode. Line 126 is the write A, read B signal. Line 128 is the write B, read A signal. The load buffer address from counter 204 is on line 210; the unload buffer address from address counter 206, on line 212.

AND gate 220 has as inputs, write A line 126 and the load buffer address line 210. AND gate 222 has for its inputs unload buffer address line 212 and the write B, read A signal on line 128. Outputs from AND gate 220 and AND gate 222 enter OR gate 225, the output of which, on line 120, is the address at which buffer A will be accessed in either write or read mode.

Similarly, AND gate 226 has as its inputs write A, read B signal on line 126 and unload buffer address on line 212. AND gate 227 has as its inputs the write B, read A line 128 and load buffer address line 210. Outputs from AND gate 226 and AND gate 227 enter OR gate 230, the output of which is the B buffer address on line 124.

Line 235 carries the three high order bits from unload buffer address counter 206 to decoder 240, an output from which on one of lines 140 through 147 indicates the appropriate one of shift registers 150 through 157 for receiving byte output from either buffer A or B.

OPERATION OF THE INVENTION

The operation of our invention is more easily understood with reference to FIGS. 3 and 4. For ease of description, it is assumed that buffer A is first to be loaded. Serial video input on line 110 enters deserializer 112. When eight bits of video data have been received in deserializer 112, shifting occurs and one byte exits deserializer 112 on line 116. In FIG. 3, the 11 bit buffer address vector in load buffer address counter 204 has not yet reached its maximum value, and no carry signal is on line 207. Coming out of toggle flip-flop 208 is a signal on line 126 to indicate a write buffer A, read buffer B condition and line 128, the write B buffer, read A buffer signal is down. The 11 bit load buffer address vector from counter 204 is on line 210. The unload buffer address from buffer address counter 206 is on line 212. Because there is a write A signal on line 126 and load buffer address on line 210 there is an output on line 223 from AND gate 220. Line 218, the read A signal being down, there is no output from AND gate 222 on line 224. The output of OR gate 225, then, is the address for buffer A, which determines which of the 2,048 bytes of buffer A will receive a byte from line 116. This process continues until all 2,048 bytes of buffer A have been loaded. When this happens, buffer address counter 204 reaches a maximum and the next clock pulse causes a carry on line 207 to toggle 208, resulting in a signal shift from line 126, the write A, read B line to line 128 the write B, read A line.

Buffer B will receive the next 2,048 bytes from deserializer 112. Since the write B signal 128 also indicates a read condition on buffer A, read cycles occur in buffer A simultaneously with the write cycles of buffer B.

The readout of buffer A will be described first. Since the write A signal 126 is down there is no output from AND gate 220. The read A, write B signal on line 128 and the unload buffer address on line 212 enter AND gate 222 with an output going to OR gate 225. Thus, the output from OR gate 225, buffer A address on line 120 is the eleven bit address from counter 206. Counter 206 is incremented in the manner described with reference to FIG. 2 to cause buffer access by byte within a column for readout. Bits 0, 1 and 2 from unload buffer address counter 206 on line 235 enter decoder 240. Output from decoder 240 for the first row of the first column of buffer A is on line 140 causing the first byte read out of buffer A to enter shift register 150. Readout continues until all eight bytes from column O of buffer A have been loaded into shift registers 150 through 157 as a result of the decoding of the row number on line 235 by decoder 240 onto lines 140 through 147. When all eight shift registers are loaded, a shift cycle is initiated, with rotated bytes, comprising the bits shifted onto lines 160 through 167, exiting on line 170 for storage in an external image memory (not shown).

Simultaneously, with the unloading of buffer A, buffer B is accepting 2,048 bytes from line 116 and storing them at the addresses indicated by counter 204. There being no write A, read B signal on line 126, AND 226 has no output. The write B, read A signal on line 128 and the load buffer address on line 210 enter AND gate 227. Output from AND gate 227 enters OR gate 230 to place on line 124 an address in buffer B for receiving bytes.

In a similar manner, when the contents of load buffer address counter 204 have again reached 2,047 and the next clock pulse comes, the carry on line 207 actuates toggle 208 and the process just described is reversed, that is, buffer A is again loaded with the next 2,048 bytes of video from deserializer 112 while at the same time buffer B is unloaded.

Figure 5A:
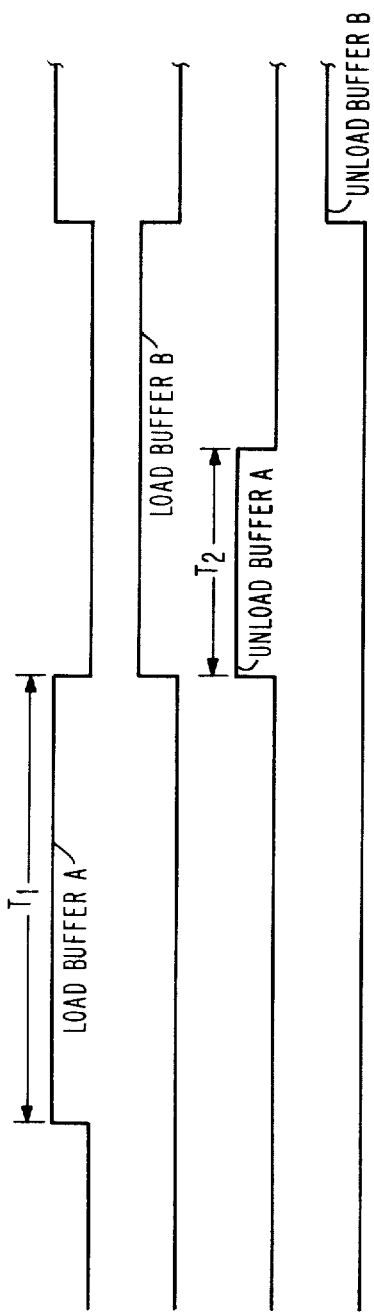
FIG. 5A presents a timing diagram for operation of the apparatus in FIG. 3.

It will be understood by those skilled in the art that buffer load and unload times are not coextensive. As shown in FIG. 5A, buffer readout occurs over a significantly shorter period than buffer loading. Time $T_1$, buffer load period, is for example about 6.14 milliseconds assuming an access cycle of 3 microseconds for each of the 2,048 byte locations. This time represents the delay at the start of an operating cycle before any rotated bytes are made available for storage in an external image memory.

Figure 5B:
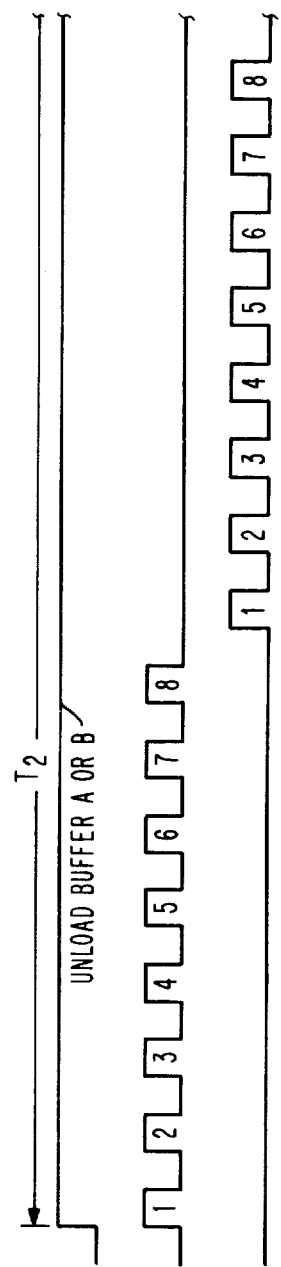
FIG. 5B shows a portion of FIG. 5A in enlarged scale.

Period $T_2$ is the time needed to output 2,048 vertically oriented bytes. Its duration is approximately 3.3 milliseconds at a rate of 1.6 microseconds per byte. The readout cycle $T_2$, as shown in more detail in FIG. 5B, and above described, includes alternately eight register loads and shift cycles for each of the 256 columns in the buffers A and B.

Of course, at the end of an operating cycle, there is a delay of time $T_2$ until the final rotated byte is available for storage.

It is important to note again that image manipulation processing may, in most applications, be initiated as soon as rotated image data begins to appear.

Although we have described, an exemplary embodiment of our invention in terms of eight bit words or bytes, it is recognized that other word lengths could be accommodated with suitable modifications. Likewise, the use of random access memories in ping-pong fashion for temporary storage is a matter of choice, herein used to enhance system throughput.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an image processing system, apparatus for transforming an $n{\times}n$, $n$ being an integer greater than 1, bit array of a horizontally oriented words of bit length $n$ into $n$ vertically oriented words of bit length $n$ at high speed in real time comprising:

deserializer means for deserializing a serial video input bit stream into parallel words of bit length $n$;

temporary word addressable matrix storage means having $nm$ locations for receiving in parallel video data words where $n$ is the number of rows and $m$ is the number of of words in a row as determined by dividing the number of bits per scan by the number of bits per word;

control means for loading said temporary word addressable storage means according to a first sequence and unloading said temporary storage means according to a second sequence;

an $n{\times}n$ bit storage array having $n$ word locations for receiving $n$ horizontally oriented words unloaded in parallel from said temporary storage means and outputting $n$ vertically oriented words each composed of all bits from corresponding bit positions in each of said horizontally oriented words in said $n{\times}n$ bit storage array.

2. The apparatus of claim 1 wherein:

said first sequence for loading said temporary storage means being by word by row by column according to a word address in a first counter arranged so that its low order positions are incremented first; and said second sequence for unloading said temporary storage means being by word by column by row according to a word address in a second counter arranged so that its high order positions are incremented first.

3. The apparatus of claim 2 wherein:

said temporary storage means comprising first and second buffers each arranged in $n$ rows and $m$ columns;

said control means further including:

toggle means, actuated by said first counter reaching its maximum, for terminating loading of said first buffer and initiating unloading of said first buffer while simultaneously initiating loading of said second buffer;

first gating means responsive to said first counter and toggle means output for indicating storage locations in said buffers for receiving words from said deserializer means;

second gating means responsive to said second counter and toggle means output for indicating storage locations in said buffers from which said $n \times n$ storage array is loaded;

decoding means responsive to said second counter for selectively enabling said $n \times n$ bit storage array to receive words from said buffers and for initiating readout upon completion of loading.

4. The apparatus of claim 3 wherein:

said first and second buffers each providing storage for 2,048 words arranged in eight rows and 256 columns;

said first and second counters maintaining 11 bit address vectors in which the three high order bits indicate rows and the eight low order bits indicate columns within said first and second buffers; and said $n \times n$ bit storage array is a block of 8 eight bit top load shift registers whereby 64 bits are loaded as eight horizontal words and serially shifted out to yield eight vertical words.

5. Apparatus for use during preprocessing of deserialized video input words in a real time image processing system requiring a word addressable image matrix in an orientation 90° rotated from video input orientation comprising:

matrix memory means arranged in N$x m$ word locations where N is an integral multiple of $n$, the number of bits per word and $m$ is the quotient of the number of bits from a single scan sweep and $n$, for receiving N$m$ video words of bit length $n$ in row sequence;

a word square array means addressable in two directions 90° apart for repetively receiving from said matrix memory means $n$ words from a column $m$ and outputting $n$ words in an orientation 90° rotated each comprising all bits from the corresponding positions in the $n$ words from column $m$;

first addressing control means for loading said matrix memory means;

second addressing control means for loading and unloading said word square array means.

6. In a real time image processing system high speed apparatus for transforming $n$, $n$ bit horizontal words of deserialized video, into $n$, $n$ bit vertical words comprising:

a temporary word addressable storage matrix for accumulating $n$ rows of $m$ horizontally oriented words each in row sequence, where $n$ is the number of bits per word and $m$ is determined by dividing the number of bits per scan sweep by $n$;

an $n \times n$ bit array, bidirectionally addressable, for receiving in parallel $n$ horizontal words from a column $m$ of said temporary storage matrix;

whereupon vertical readout of said $n \times n$ bit array yields $n$ vertical words each made up of all bits in a given position in the horizontal words.

* * * * *